United States Patent Office 3,506,646
Patented Apr. 14, 1970

3,506,646
PROCESS FOR THE PREPARATION OF 7H-PYRIDO
[1,2-b][1,2,5]BENZOTHIADIAZEPINE 5,5 - DIOX-
IDES AND PYRROLO[1,2-b][1,2,5]BENZOTHIADI-
AZEPINE 5,5-DIOXIDES
Peter H. L. Wei, Upper Darby, and Stanley C. Bell, Philadelphia, Pa., assignors to American Home Products Corporation, New York, N.Y., a corporation of Delaware
No Drawing. Filed June 27, 1966, Ser. No. 565,335
Int. Cl. C07d 99/00
U.S. Cl. 260—239.3     1 Claim

ABSTRACT OF THE DISCLOSURE

This invention relates generally to chemical compounds that are derivatives of 6-aminophenylsulfonyl compounds. More particularly, the invention relates to 1,2,5-benzothiadiazepine 1,1-dioxides having the heterocyclic ring fused on the "b" face thereof and having valuable pharmacological properties; to intermediates useful in the preparation of the first-named compounds and having also similar pharmacological properties; and to methods for preparing said intermediates and said benzothiadiazepine dioxide compounds therefrom. The compounds are useful as diuretic and hypotensive agents.

---

The 1,2,5-benzothiadiazepine 1,1-dioxides having a heterocyclic ring fused on the "b" face thereof, in accordance with the present invention, may be represented by the following general formula:

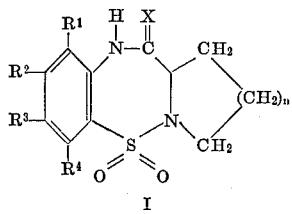

I wherein $R^1$, $R^2$, $R^3$ and $R^4$ each are selected from the group consisting of hydrogen, lower alkyl, halogen and trifluoromethyl; X is selected from the group consisting of oxygen and two atoms of hydrogen; and $n$ is an integer from 1 to 2.

The intermediates useful in the preparation of the compounds of Formula I above, and also for their pharmacological properties; may be represented by the following general formula:

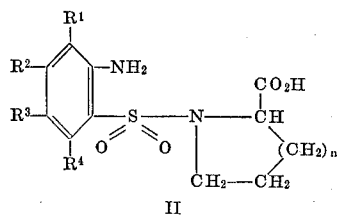

II wherein $R^1$, $R^2$, $R^3$, $R^4$ and $n$ are as defined above with respect to Formula I.

It has been discovered that compounds of this invention having Formula I have useful pharmacological activities in that they function as potent central nervous system stimulators, particularly as diuretic and hypotensive agents. The compounds of the invention of Formula II, as referred to hereinbefore, have been found to be valuable intermediates which are particularly useful for preparing the compounds of Formula I in procedures, including those described hereinafter. Moreover, said components which are useful as intermediates show pharmacological activity similar to that exhibited by the compounds of Formula I; namely, they also function as central nervous system stimulators.

In preparing the intermediates of Formula II, there may be reacted, as suitable starting materials, a selected 6-aminophenylsulfonyl halide with either pipecolinic acid or proline (depending upon whether the fused ring structure desired is to be pyrido or pyrrolo) in the presence of a strong inorganic base, such as sodium hydroxide, to result in, e.g., the sodium salt of a 1-substituted 6-aminophenylsulfonyl pipecolinic acid or proline. The solution containing the basified product is then acidified, as by addition of a mineral acid. Upon treatment of the resulting pipecolinic acid or proline derivative with phosphorus pentachloride or sulfonyl chloride; ring closure occurs to result in a compound of Formula I wherein X is oxygen. To obtain the corresponding derivative wherein X comprises two atoms of hydrogen, the oxo compound may be reduced in the presence of lithium aluminum hydride, for example.

In an alternative procedure of the invention, the starting materials; i.e., the selected 6-aminophenylsulfonyl halide and the pipecolinic acid or proline reactants are reacted in the presence of a strong base to result, surprisingly, in the direct formation of an appreciable amount of the oxo derivative, which may be reduced to the product of Formula I, as in the first described method.

The two routes of preparation described above are indicated schematically below, wherein $R^1$, $R^2$, $R^3$, $R^4$, and $n$ have the same meaning as described hereinbefore.

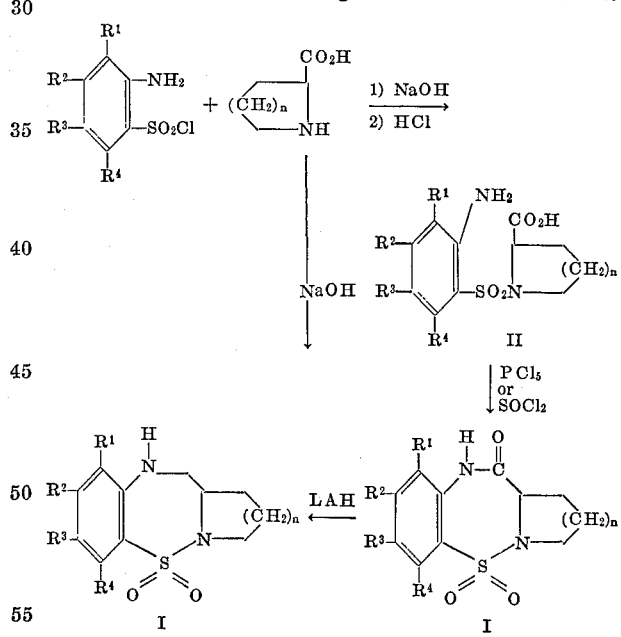

When the compounds of the invention are employed as central nervous system stimulators, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets or capsules, which may contain conventional excipients, or in the form of solutions; or they may be injected parenterally, that is intramuscularly, intravenously or subcutaneously. For parenteral administration, they may be used in the form of sterile solutions containing other solutes, for example, enough saline or glucose to make the solutions isotonic.

The dosage of the present therapetuic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 1 mg. to about 200 mg. per kg. of body weight per day, although as aforementioned, variations will occur. However, a dosage level that is in the range of from about 5 mg. to about 75 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I 1-(6-amino-4-chloro-m-tolylsulfonyl)-pipecolinic acid

Pipecolinic acid (25.8 g. or 0.20 m.) is gradually added to 100 ml. of sodium bicarbonate solution, followed by 24.0 g. (or 0.10 m.) of 6-amino-4-chloro-m-tolylsulfonyl chloride. 10 percent NaOH (50 ml.) is also added. The mixture is heated on a steam bath for 1 hr. Some insoluble material is filtered off which is 2-chloro-8,9,10,10a-tetrahydro-3-methyl - 7H-pyrido[1,2-b][1,2,5]benzothiadiazepin-11(12H)-one 5,5-dioxide. The aqueous solution is first extracted with benzene, treated with Darco and acidified with hydrochloric acid. The oily material which is separated out is collected. It is recrystallized from benzene and has M.P. dec. 145° C.

Calc'd for $C_{13}H_{17}ClN_2O_4S$ (percent): C, 46.85; H, 5.13; Cl, 10.66; N, 8.41; S, 9.64. Found (percent): C, 46.73; H, 5.01; Cl, 10.60; N, 8.56; S, 9.25.

EXAMPLE II 2-chloro-8,9,10,10a-tetrahydro-3-methyl-7H-pyrido[1,2-b][1,2,5]benzothiadiazapin-11(12H-one 5,5-dioxide (A) 1-(6-amino-4-cholor - m - tolylsulfonyl)-pipecolinic acid (6.0 g.) is dissolved in 1,2-dichloroethane. Phosphorus pentachloride (5.0 g.) is added. The solution is stirred at room temperature for 2 hrs. The solid is collected and recrystallized from benzene M.P. 259–261° C.

(B) 1-(6-amino-4-chloro - m - tolylsulfonyl)-pipecolinic acid (9.0 g.) is dissolved in 80 ml. of thionyl chloride. The solution is stirred in a water bath at 50° C. for 4 hrs. Excess thionyl chloride is removed and the residue flushed with benzene. The residue is collected and washed with benzene and ether to obtain 9.0 g. of product.

Calc'd for $C_{13}H_{15}ClN_2O_3S$ (percent): C, 49.50; H, 4.80; Cl, 11.26; N, 8.88; S, 10.20. Found (percent): C, 49.86; H, 4.72; Cl, 11.39; N, 8.65; S, 9.90.

EXAMPLE III 2-chloro-8,9,10,10a,11,12-hexahydro-3-methyl-7H-pyrido [1,2-b][1,2,5]benzothiadiazepine 5,5-dioxide 2-chloro-8,9,10,10a-tetrahydro - 3 - methyl-7H-pyrido [1,2-b][1,2,5]benzothiadiazepin-11(12H)-one 5,5-dioxide (11.0 g.) is added to 4.0 g. of lithium aluminum hydride in tetrahydrofuran. The solution is heated at reflux for 4 hrs. and then cooled. Water is slowly added to decompose the unused lithium aluminum hydride. The inorganic salts are filtered off and washed with tetrahydrofuran. The combined organic layers, after dying in anhydrous magnesium sulfate, are concentrated, and the residue recrystallized from benzene M.P. 217–9° C.

Calc'd for $C_{13}H_{17}ClN_2O_2S$ (percent): C, 52.00; H, 5.70; Cl, 11.83; N, 9.33; S, 10.70. Found (percent): C, 52.13; H, 5.52; Cl, 11.30; N, 8.86; S, 10.60.

EXAMPLE IV

L-1-(6-amino-4-chloro-m-tolylsulfonyl)-proline

To a solution of 19.5 g. (0.17 m.) of L-proline in 100 ml. of sodium bicarbonate is added 24.0 g. (0.10 m.) of 6-amino-4-chloro-m-tolylsulfonyl chloride, followed by 4.0 g. of sodium hydroxide. The solution is heated on a steam bath for 4 hrs. A small amount of solid is filtered off. The filtrate is acidified with hydrochloric acid. The precipitated acid is collected and washed well with water. The crude material is recrystallized from ethyl alcohol, M.P. 168–170° C.

Calc'd for $C_{12}H_{15}ClN_2O_4S$ (percent): C, 45.25; H, 4.73; Cl, 11.13; N, 8.78; S, 10.08. Found (percent): C, 45.51; H, 4.63; Cl, 10.95; N, 8.73; S, 9.80.

EXAMPLE V

L-8-chloro-7-methyl-1,2,3,11a-tetrahydro-pyrrolo[1,2-b][1,2,5]benzothiadiazepin-11(10H)-one 5,5-dioxide L - 1-(6-amino-4-chloro-m-tolylsulfonyl) - proline (17 g.) is dissolved in 100 ml. of thionyl chloride and the solution heated in a water bath (40° C.) for 3 hrs. Thionyl chloride is removed and the residue flushed with benzene to obtain 9.0 g. of product. This was recrystallized from benzene, M.P. 171–3° C.

Calc'd for $C_{12}H_{13}ClN_2O_3S$ (percent): C, 47.90; H, 4.35; Cl, 11.80; N, 9.30; S, 10.67. Found (percent): C, 47.72; H, 4.21; Cl, 11.80; N, 9.34; S, 10.60.

EXAMPLE VI

L-8-chloro-7-methyl-1,2,3,10,11,11a-hexahydro pyrrolo [1,2-b][1,2,5]benzothiadiazepine 5,5-dioxide L-8-chloro-7-methyl-1,2,3,11a - tetrahydro-pyrrolo [1,2-b][1,2,5]benzothiadiazepin-11-(10H)-one 5,5 - dioxide (8.0 g.) is added to a suspension of 4.0 g. of lithium aluminum hydride in tetrahydrofuran (THF). The solution is heated to reflux for 8 hrs. and then cooled. Enough water is added to decompose any unused hydride. The inorganic salts are removed and washed well with THF. The combined THF solution, after drying over anhydrous magnesium sulfate, is concentrated and the residue recrystallized from benzene to give 3.5 g., M.P. 178–180° C.

Calc'd for $C_{12}H_{15}ClN_2O_2S$ (percent): C, 50.30; H, 5.26; Cl, 12.35; N, 9.76; S, 11.20. Found (percent); C, 50.98; H, 5.66; Cl, 12.00; N, 9.48; S, 11.20.

EXAMPLE VII 1-(6-amino-5-ethyl-4-fluoro-benzenesulfonyl)-pipecolinic acid

Following the procedure of Example I, pipecolinic acid is reacted with 6-amino - 5 - ethyl-4-fluoro-benzenesulfonyl cloride to obtain the title compound.

EXAMPLE VIII 2-fluoro-8,9,10,10a-tetrahydro-1-ethyl-7H-pyrido[1,2-b][1,2,5]benzothiadiazepin-11-(12H)-one 5,5-dioxide Following the procedure of Example II(A), 1-(6-amino - 5 - ethyl - 4 - fluoro-benzenesulfonyl)pipercolinic acid is treated with phosphorus pentachloride to obtain the title compound.

EXAMPLE IX 2-fluoro-8,9,10,10a,11,12-hexahydro-1-ethyl-7H-pyrido [1,2-b][1,2,5]benzothiadiazepine 5,5 dioxide Following the procedure of Example III, the product obtained in Example VIII is treated with lithium aluminum hydride to obtain the title compound.

EXAMPLE X

L-1-[6-amino-4-chloro-3-trifluoromethyl-benzenesulfonyl]-proline

Again following the procedure of Example I, but in this instance reacting L-proline with 6-amino-4-chloro-3,trifluoromethyl-benzenesulfonyl chloride, the title compound is obtained.

EXAMPLE XI

L-8-chloro - 7 - trifluoromethyl - 1,2,3,11a - tetrahydropyrrolo[1,2-b][1,2,5]benzothiadiazepin - 11(10H)-one 5,5-dioxide Again following the procedure of Example II(A), but in this instance treating the compound obtained in Example X with phosphorus pentachloride, the title compound is obtained.

EXAMPLE XII

L-8-chloro-7-trifluoromethyl-1,2,3,10,11,11a-hexahydropyrrolo[1,2-b][1,2,5]benzothiadiazepine 5,5-dioxide The procedure of Example III is followed, utilizing, however, as the starting material, the compound obtained in Example XI which, when treated with lithium aluminum hydride, results in the title compound.

We claim:
1. A method for preparing a compound selected from the group having the following formula:

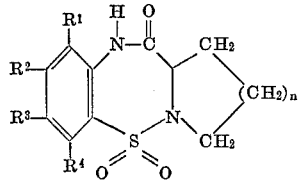

wherein $R^1$, $R^2$, $R^3$, and $R^4$ each are selected from the group consisting of hydrogen, lower alkyl, halogen, and trifluoromethyl; and $n$ is an integer from 1 to 2; which method comprises:
 (A) forming a basified reaction mixture comprising:
  (1) a compound selected from the group having the follow formula:

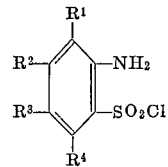

wherein $R^1$, $R^2$, $R^3$, and $R^4$ are defined above;
  (2) a compound selected from the group having the following formula:

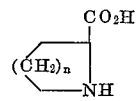

wherein $n$ is as defined above; and
  (3) a strong base; and
 (B) heat-reacting said mixture to produce directly therein, a compound of the Formula I above.

References Cited

UNITED STATES PATENTS 3,341,520  9/1967  Pfenninger _____ 260—239.3

FOREIGN PATENTS 6,500,953  7/1965  Netherlands.
658,844  7/1965  Belgium.
658,845  7/1965  Belgium.

HENRY R. JILES, Primary Examiner

R. T. BOND, Assistant Examiner

U.S. Cl. X.R.

260—326.3, 293.4; 424—267, 274